2 Sheets. Sheet 1.
J. H. Wilkinson,
Lubricator.
No. 101,954.  Patented Apr. 12, 1870.
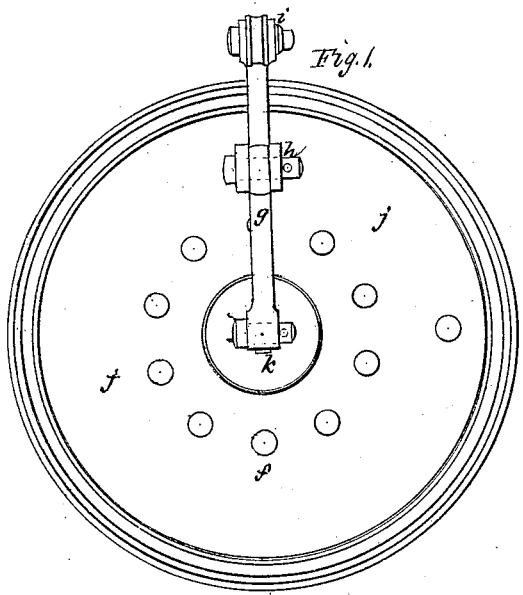
Fig. 1.
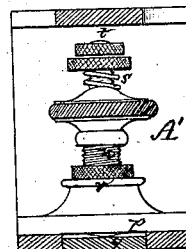
Fig. 2.
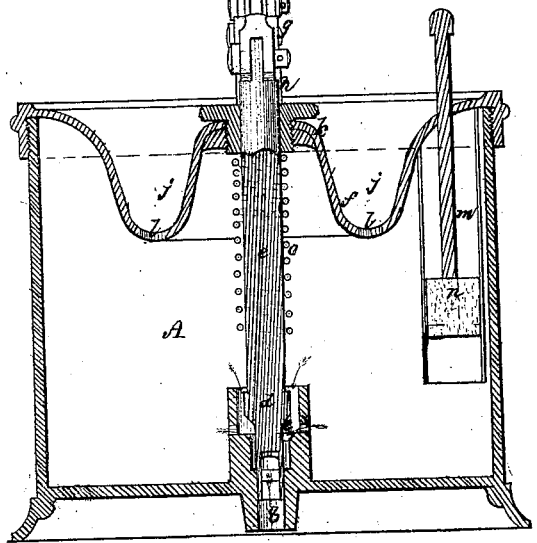
Witnesses.
E. Griffith
Geo. A. Loring
J. H. Wilkinson.
By his Attorney
Frederick Curtis.

J. H. Wilkinson,
Lubricator.
No. 101,954.  Patented Apr. 12. 1870.
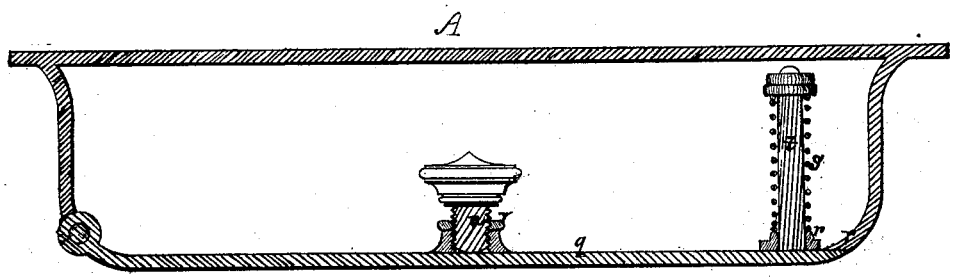
Fig. 3.
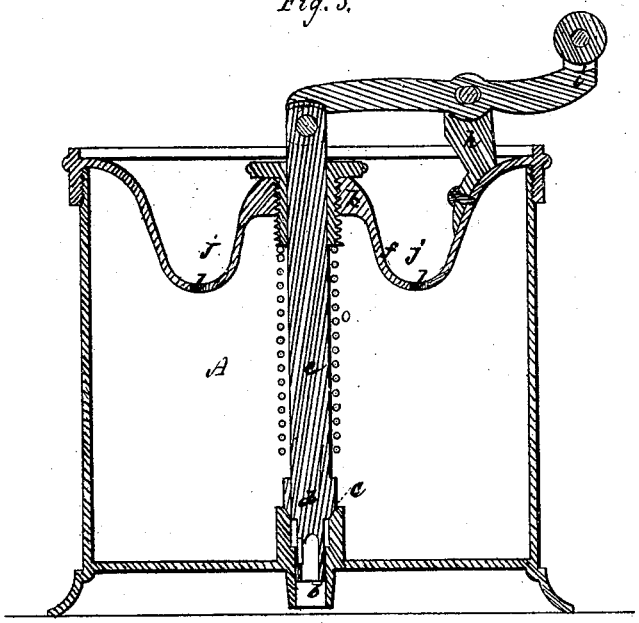
Witnesses  
Geo. A. Leming  
Edward Griffith
J. H. Wilkinson  
by his Attorney  
Frederick Curtis

UNITED STATES PATENT OFFICE.

JOSEPH H. WILKINSON, OF SOUTH NEWMARKET, NEW HAMPSHIRE.

IMPROVEMENT IN LUBRICATORS.

Specification forming part of Letters Patent No. 101,954, dated April 12, 1870.

*To all whom it may concern:*

Be it known that I, JOSEPH H. WILKINSON, of South Newmarket, Rockingham county, and State of New Hampshire, have made an invention of a new and useful improvement or improvements in oil-cups for movable bearings of machinery; and I do hereby declare the following to be a full, clear, and exact description thereof, due reference being had to the accompanying drawings, making part of this specification, and in which—

Figure 1 is a plan, and Figs. 2 and 3 vertical sections, of a device embodying my invention or improvements.

The invention embraced in the following description and comprising the subject-matter of these Letters Patent has reference to instrumentalities for effecting at regular intermittent periods of time the flow of oil or oleaginous lubricating material to the movable bearings of machinery, and more especially of crank-pin journals of marine engines, the object sought in originating such invention being not only to economize to a great and valuable entent the present waste of oil, but to enable the lubrication of movable bearings to be accomplished with much less difficulty and danger than by any mode heretofore adopted. as the direction of motion of a crank through a circular path, added to the rapidity of such motion, renders it difficult to a person even of great experience, and in fact impossible to pour oil into the ordinary bearings without great waste of material and liability to personal danger.

The crank-pin journal of an engine acquires unusual and constant attention, and the invention herein described, which is intended to insure a constant supply of oil without waste, consists, primarily, in the employment of a cistern or vessel provided with a concavous and foraminous cover, and at bottom with a valve port or passage connected with and governing an eduction-port formed in the bottom of the vessel thereat, the intermittent vertical movements of the said valve being effected by means of a tilting lever pivoted to its rod and fulcrumed to the cover of the cistern, the proper movements of the lever being in turn produced by its impact with a pendent abutment or adjustable bar or bracket disposed above the said lever, this impact of the two occurring as the device attached to the crank-rod approaches or reaches its greatest altitude, as hereinafter explained, an indicating-float being combined with the oil-reservoir to denote the quantity of oil contained therein, the whole being as hereinafter explained.

In the drawings before referred to as accompanying this specification, A denotes an upright cylindrical well or reservoir provided with an eduction-orifice, $b$, leading from the center of its bottom, such cistern in practical use being fixed securely about the bearing to be lubricated, and with its eduction-port $b$ coincident with the oiling hole or passage, whether that of a steam-engine crank or other object.

Surmounting and surrounding the eduction-port $b$ is a valve-seat, $c$, while combined and operating with such valve-seat is a suitable valve, $d$, the stem or shank $e$ of such valve ascending through the cap or cover $f$ of the cistern $a$, which serves as a bearing for it, the upper extremity of such valve-stem being pivoted to one extremity of an oscillating lever, $g$, which surmounts the cover $f$, and which is pivoted to a bearing or standard, $h$, erected upon one side of such cover, the outer and free end, $i$, of the said lever being prolonged beyond the periphery of the cover somewhat, in order to secure the desired leverage to actuate the valve, as hereinafter stated.

The cover of the reservoir, as shown in the drawings, is concavous, or is formed with a sunken channel, $j$, surrounding the bearing $k$ of the valve-stem and concentric therewith, the bottom of such channel being perforated with a plurality of orifices, $l\ l$, &c., to permit of the passage to the interior of the cistern of oil poured into the cover, the concavous form of the cover enabling this act of supplying the cistern with oil to be readily and expeditiously accomplished without waste of material while such cistern is in rapid motion in a circular path.

To one edge of the cover of the cistern I attach a small tube, $m$, extending nearly to the bottom of the cistern, while within such tube I dispose a float, $n$, and continue a rod or stem of this float upward through a passage made through the cover for its reception, and affix to such rod a conspicuous head, that it may be readily seen at all times by the attendant. The float $n$ should be placed upon the side of the cover at right angles to the longest plane of the lever $i$ and in alignment with the keel of the vessel, the same being in order, that the tube shall be inserted to the greatest possible extent at all times within the oil of the reservoir. The length of the rod of the float or the distance of the latter from the bottom of the cistern is to be adapted to the amount of oil which such cistern shall be compelled under all circumstances to maintain, and the attendant is never to allow the head of such rod to descend as low as the cover of the cistern, since as the float is buoyed by the oil the position of the head above the cover indicates the excess of oil above the lowest point which it should be allowed to reach. The above-described float forms a very useful auxiliary to my invention.

A spiral spring, $o$, encompasses the valve-stem $e$, and is affixed at its lower end to such stem, the upper extremity of the spring abutting against the top of an annular chamber formed in the cover of the reservoir and below the bearing of said valve-stem, the distention of the spring serving to force the valve upon its seat except when raised therefrom by the action of the lever $g$.

$A'$ in the accompanying drawings represents a pendent or hanging bracket or support which is to be disposed above the oscillating lever $g$ and in the circular path of movement of and intercepting such levers, whether the point of suspension be the deck of the vessel or other object. This bracket $A'$ is formed with a central longitudinal orifice or slot, $p$, while disposed within such slot will be seen a tongue, $q$, pivoted at one extremity to the contiguous end of the bracket, and so as to be susceptible of vertical vibrations at its opposite end with respect thereto and against an abutment or stop, $r$, making part of such bracket, the elevations of the tongue against such stop being effected by the agency of a coiled spring, S, resting upon such abutment and confined to the upper end of a post, $t$, erected upon the free end of such tongue and passing through the abutment. The varying depressions of the tongue $q$ are effected by means of a screw, $u$, which is secured through a plate or nut, $v$, spanning the slot $p$ of the bracket, the purpose of this screw being to effect various altitudes of the tongue, by which means I effect corresponding variations in the length of the depression of the outer end of the lever $g$, and consequently the elevation of the valve.

The above comprises, substantially, the mechanical construction of the device embodying my present invention, the operation of such device being briefly as follows: The motion of the oil-reservoir through a circular path carries the outer end of the lever $g$ in contact with the under surface of the suspended bracket $A'$ or its tongue $q$, the resulting consequence of this impact of the two being a depression of the outer end of the lever and an ensuing elevation of its inner end. This elevation of the inner end of the lever $g$ effects, as will be at once apparent, an ascent of the valve from its seat and opens the eduction-port $b$ of the cistern $a$ to the flow of oil through it and to the bearing to be lubricated, this intermittent raising of the valve and opening of the port being amply sufficient to supply the said bearing with lubricating material.

It may become necessary in many localities to vary the amount of oil discharged from the above-described oiling apparatus, and should such necessity exist my purpose in affixing the tongue $q$ in position in an adjustable manner will be at once apparent, since the longer the lever $g$ is in contact with this tongue the greater will be the extent of its depression and of the ascent of the valve, it being of course understood that the greater the ascent of the valve the longer the period of time its port is open, and the greater the quantities of oil admitted to the bearing.

I would remark that should any accident happen to disable the functions of the lever $g$, the operation of my invention is not necessarily entirely suspended, as should such lever be entirely removed the attendant has only to elevate the bearing $k$ of the valve-stem, (which, as shown in the drawings, is screwed into position for the purpose,) when the valve will be raised from off its seat and maintained in such position, thus permitting free flow of oil through its port, it being understood that the screw-plug and bearing and the contiguous part of the upper end of the valve-rod are to be so constructed or provided that when the lever $g$ is disabled or removed the said cap and valve-stem are to be connected together in such manner that an elevation of the plug shall effect the desired elevation of the valve-stem and valve.

The connection of the bearing or plug and valve-stem may be a piece passed through the latter and resting upon the top of the former, or other means may be adopted; but whatever the device, it must be disconnected or removed before permitting the functions of the lever or its substitute to begin.

Although I have in the accompanying drawings exhibited one outlet from below the valve, the device may be provided with a plurality, if desired, in order to lubricate a bearing at two or more points, which in the case of large marine engines is often done.

I do not herein intend to confine myself strictly to the use of the lever $g$ for operating the valve, as other means may be adopted to effect the movements of such valve, for in experimenting with my oil-cup I have made use of various devices for operating the valve-stem, but none proved so satisfactory to myself as the lever, and therefore I have adopted that mode in this my application.

Having thus described the nature and purposes of my present invention and exhibited it in one practical form in which the same may be carried out, I claim as my invention, and desire to secure by Letters Patent of the United States, the following:

1. The combination of the valve or device for regulating the discharge of the oil with a system of levers, or the mechanical equivalent of the same, connected with said valve, and operated as herein described during the movement of the oil-cup, to allow the intermittent escape or discharge of oil from the reservoir, as shown and set forth.

2. The combination, with the oil-reservoir, of an indicator constructed as herein described for determining the quantity of oil in the cup.

3. The construction of the cover of the oil-cup or reservoir in the manner shown and specified.

4. An oiling or lubricating device for movable bearings, composed of the cistern $a$, with its outlet-port $b$, the valve $d$, and lever $g$, pivoted together as explained, in combination with the bracket $A'$, or its equivalent, the whole being arranged and operating substantially as hereinbefore explained.

5. The arrangement of the valve-stem and its bearing $k$, whereby the height of the valve may be varied to compensate for injury to the lever $g$ or other actuary of such valve.

JOSEPH H. WILKINSON.

Witnesses:
FRED CURTIS,
E. GRIFFITH.